R. M. ZIMMERMAN.
DUMP CAR.
APPLICATION FILED AUG. 26, 1910.
1,008,444.
Patented Nov. 14, 1911.
4 SHEETS—SHEET 1.
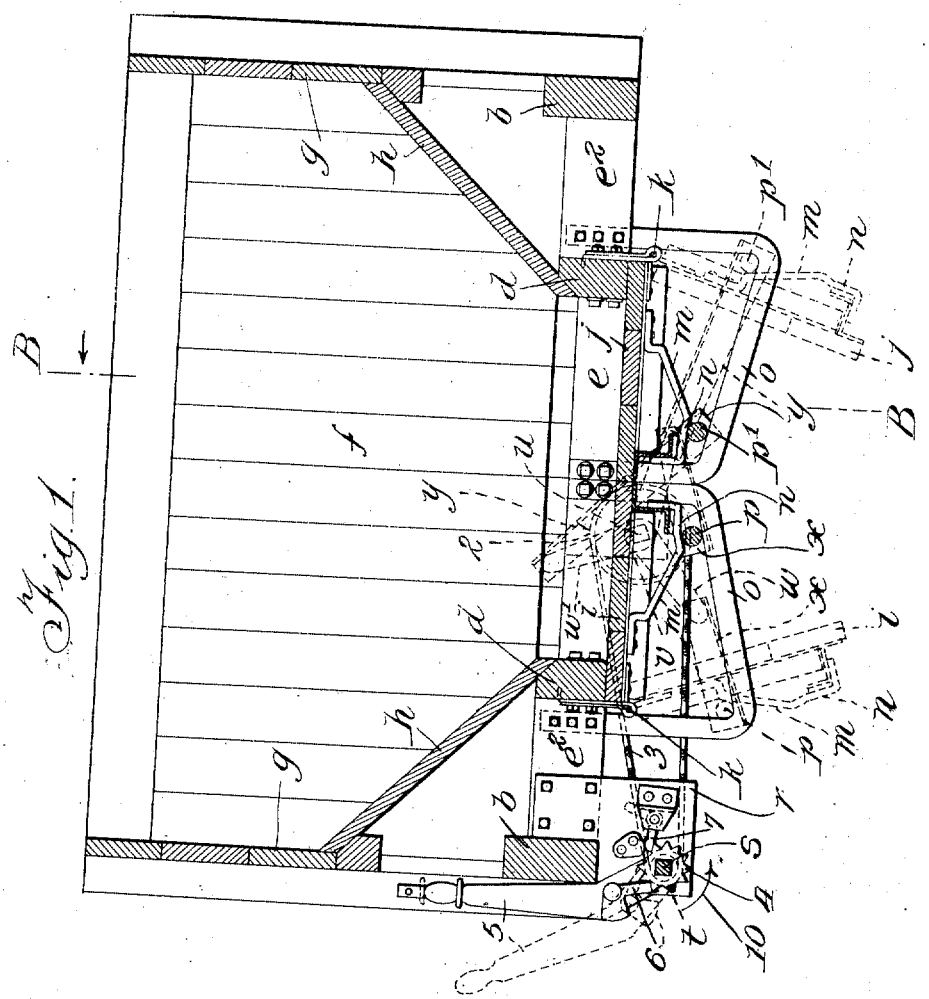

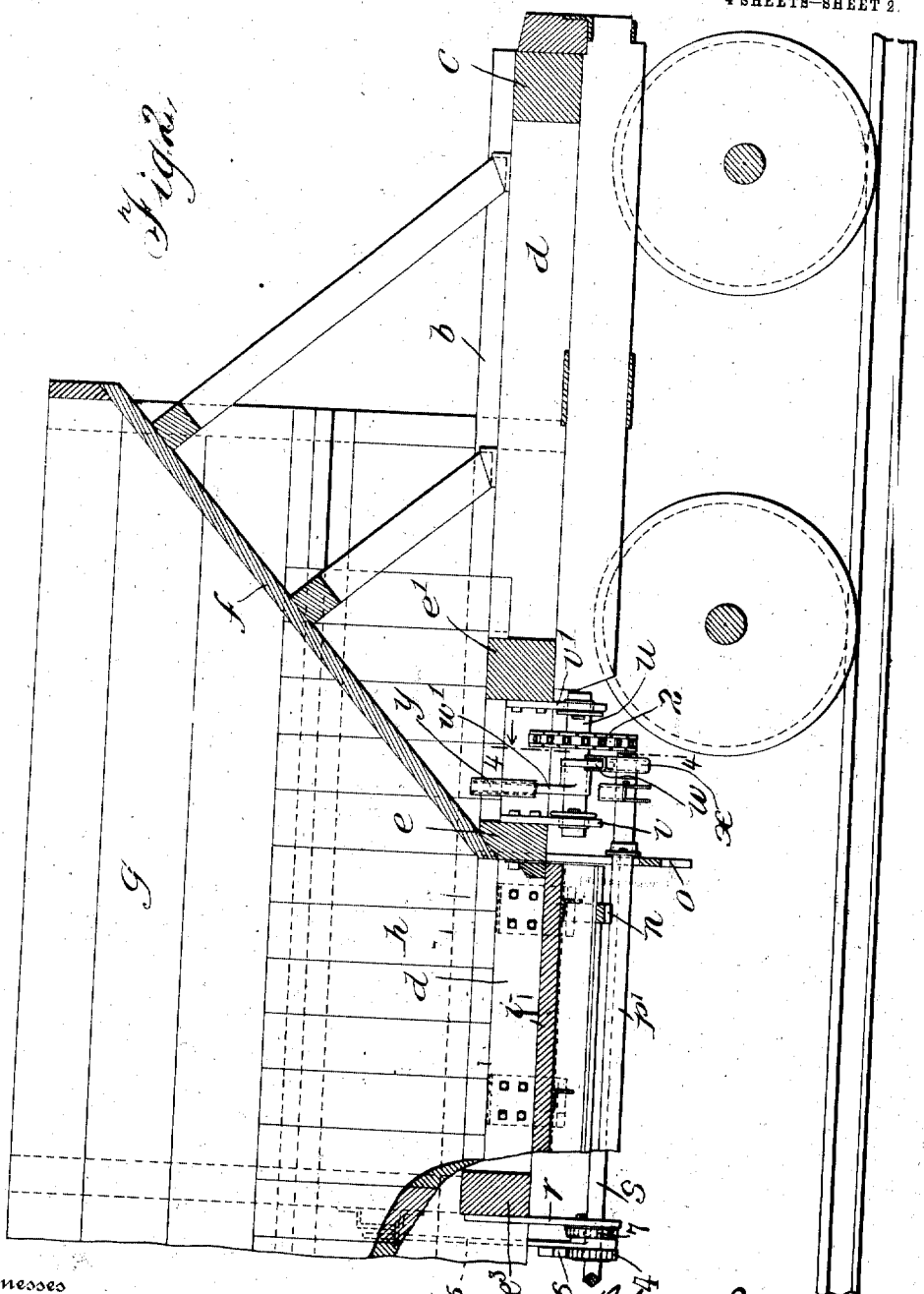

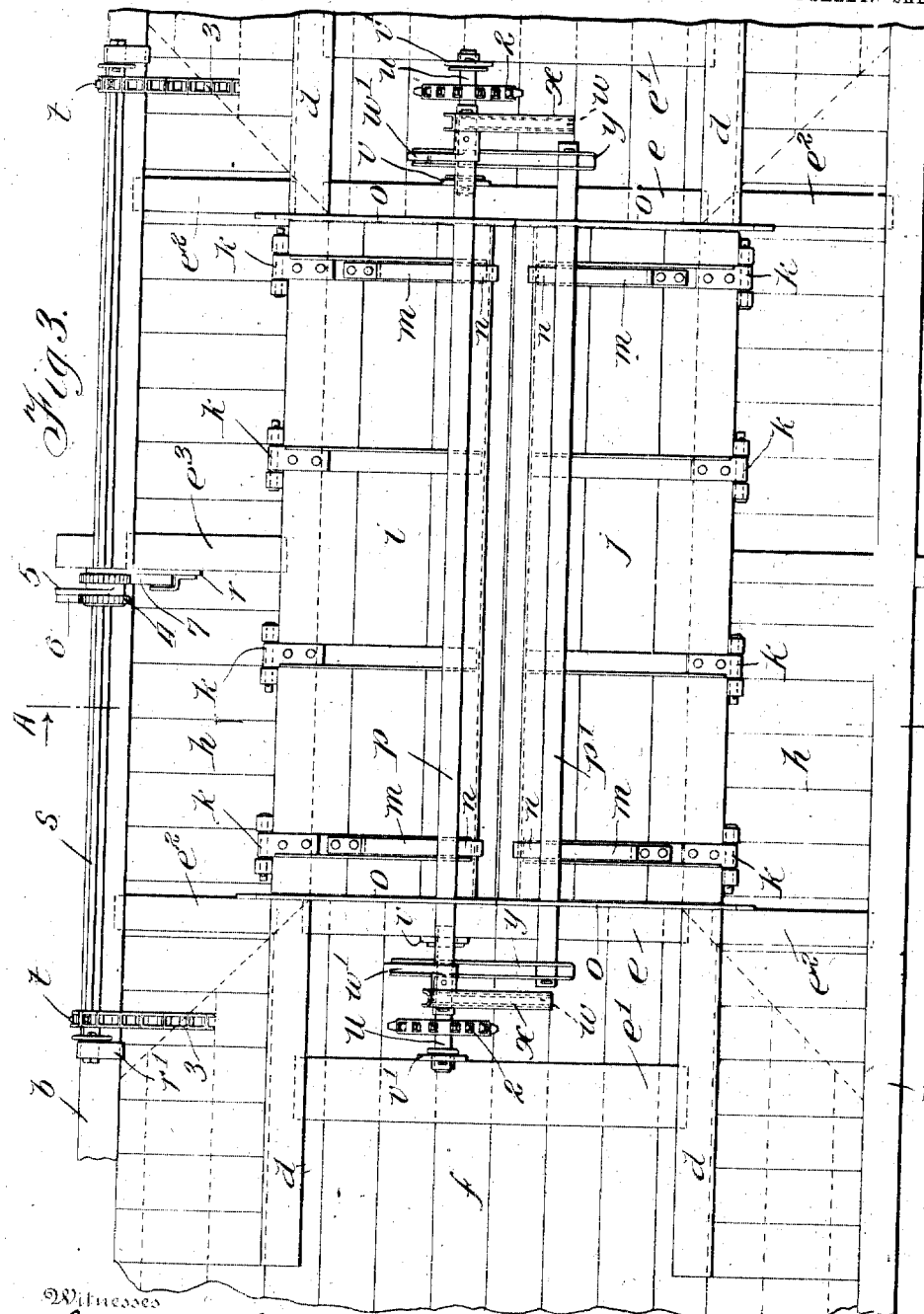

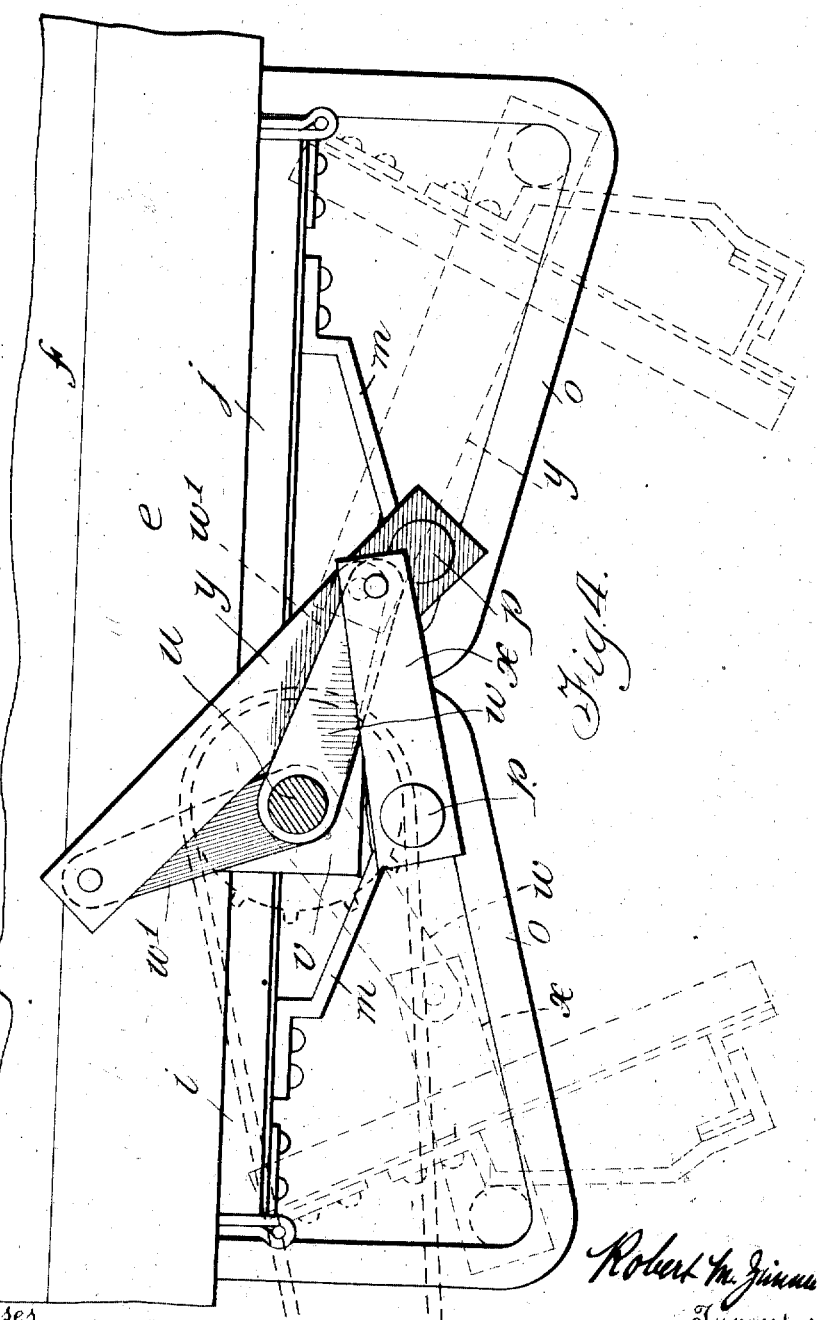

UNITED STATES PATENT OFFICE.

ROBERT MONTAGUE ZIMMERMAN, OF MONTREAL, QUEBEC, CANADA, ASSIGNOR TO NATIONAL DUMP CAR COMPANY, OF CHICAGO, ILLINOIS, A CORPORATION OF MAINE.

DUMP-CAR.

1,008,444. Specification of Letters Patent. Patented Nov. 14, 1911.

Application filed August 26, 1910. Serial No. 579,141.

*To all whom it may concern:*

Be it known that I, ROBERT MONTAGUE ZIMMERMAN, of the city of Montreal, Province of Quebec, Canada, have invented certain new and useful Improvements in Dump-Cars; and I do hereby declare that the following is a full, clear, and exact description of the same.

My invention relates particularly to dump cars of the type having fixed bodies presenting a discharge opening and gravity discharge doors for the said opening, and the invention may be said to consist of the construction, combination, and particular arrangement of parts hereinafter described and pointed out in the claims. For full comprehension, however of my invention reference must be had to the accompanying drawings forming a part of this specification in which similar reference characters indicate the same parts and wherein:

Figure 1 is a transverse vertical sectional view of a car constructed according to my invention, the section being taken on line A, A, Fig. 3; Fig. 2 is a longitudinal vertical sectional view of one end of the car, taken on line B, B, Fig. 1; and Fig. 3 is a plan view of the underside of the car with the ends broken away. Fig. 4 is an enlarged detail transverse section taken on line 4—4 Fig. 2.

In the car illustrated the body comprises a floor frame consisting of a pair of side sills $b$, end sills $c$, longitudinal intermediate sills $d$, and auxiliary sills $e$ $e'$ and $e^2$, $e^3$ situated transversely between the sills $d$ $d$ and the sills $d$ and $b$ respectively, and the superstructure carried by this floor frame comprises inclined end hopper walls $f$ and side walls consisting of vertical and inclined portions $g$ and $h$ respectively, the longitudinal intermediate sills $d$ and auxiliary sills $e$ having the hopper walls fastened thereto and forming the frame of the discharge opening of the car.

The doors, $i$ and $j$, are hinged as at $k$ to the sills $d$ forming the sides of the discharge opening, and are provided on their underside with rails presenting tread surfaces $m$ $n$ the latter of which, when the doors are closed, converge slightly toward supporting rails $o$ suspended from the floor framing. The doors are operated by laterally movable shafts $p$ and $p'$ in conjunction with the supporting rails $o$, the rails on the underside of the doors and unitary gear operatively connected to both doors and comprising the following mechanism. A series of bearing brackets $r'$ and $r$ suspended from the side and auxiliary sills, $b$ and $e^3$ respectively, support an oscillatory shaft S having mounted rigidly thereon, near its ends a pair of sprocket wheels $t$ to be presently further alluded to. A pair of alined counter-shafts $u$ are situated one at each end of the doors and to one side of the meeting point of such doors and above the rails which support the shaft $p$, each shaft being rotatively supported in a pair of bearings $v$ and $v'$ suspended respectively from the auxiliary sills $e$ and $e'$. A pair of crank arms $w$ and $w'$ are rigidly mounted on these shafts, the ends of the crank arms being connected to the shafts $p$ and $p'$ respectively, by pitmen $x$ and $y$ of channel cross-section, the arms $w$ and $w'$ of each pair being formed on a common hub and arranged out of line with one another to allow one pitman to pass the other. The pitmen $y$ are of greater length than the pitmen $x$ so as to compensate for the greater distance between the shaft $p'$ and the counter-shafts $u$ than between the shaft $p$ and these counter-shafts. Sprocket wheels 2, of greater diameter than the sprocket-wheels $t$ on the shaft S, are rigidly mounted upon the counter-shafts $u$ between the crank-arms $w$ and the bearings $v'$ and are operatively connected to the said sprocket wheels $t$ by chains 3. The shaft S is rotated by a lever 5 fulcrumed thereon and carrying a weighted pawl 6 which engages a ratchet wheel 4 mounted rigidly on the shaft, while a detent pawl 7 engages another ratchet wheel on the shaft to lock the latter against reverse rotation.

Operation: When it is desired to close the doors the shaft S is rotated in the direction of arrow 10 thus operating the crank arms, by means of the sprocket-wheels and chains, and pulling the shafts $p$ and $p'$ up their respective supporting rails and raising the doors to their closed position, the shafts becoming wedged between the converging surfaces of the rails $o$ and the portion $n$ of the rails on the underside of the doors thus locking the doors in their closed position. To open the doors the shaft is rotated in the opposite direction which causes the crank arms to pull the shafts $p$ and $p'$ from their locking position and allows the doors to fall to their full open position.

What I claim is as follows:—

1. In a dump car, the combination with a pair of hinged doors, laterally movable door supporting members upon which the doors rest freely, a main shaft and means for operating the same, of a counter shaft; a pair of crank arms on such counter shaft; pitmen operatively connecting the crank arms to the door supporting members, and means connecting the counter-shafts to the main shaft.

2. In a dump car, the combination with a pair of doors, laterally movable door supporting shafts, a main shaft and means for operating the same, of a pair of counter-shafts supported one at each end of the doors; a pair of crank arms on each counter-shaft; pitmen operatively connecting the crank arms to the door supporting shafts, and means connecting the counter-shafts to the main shaft.

3. In a dump car, the combination with a pair of hinged doors, laterally movable door supporting shafts a main shaft and means for operating the same, of a pair of counter-shafts supported one at each end of the doors; a pair of double crank arms on each counter-shaft; pitmen operatively connecting the opposite ends of the double crank arms to the door supporting shafts, and means connecting the counter-shafts to the main shaft.

4. In a dump car, the combination with a pair of hinged doors, laterally movable door supporting shafts a main shaft and means for operating the same, of a pair of counter-shafts supported at the ends of the doors; a pair of double crank arms on each counter-shaft and disposed in different vertical planes; pitmen operatively connecting the opposite ends of the double crank arms to the door supporting shafts, and means connecting the counter-shafts to the main shaft.

5. In a dump car, the combination with a pair of hinged doors, laterally movable door supporting shafts a main shaft and means for operating the same, of a pair of counter-shafts supported at the ends of the doors; a pair of double crank arms on each counter-shaft and disposed in different vertical planes; pitmen operatively connecting the opposite ends of the double crank arms to the door supporting shafts; sprocket wheels upon the counter-shafts and main shaft respectively; and chains operatively connecting the sprocket wheels.

6. In a dump car, the combination with a pair of hinged doors, laterally movable door supporting shafts and a main shaft, of a pair of counter-shafts; bearings suspended from the car at each end of the doors and at one side of the center of the car and rotatively supporting the counter-shafts, a pair of double crank arms on each counter-shaft and disposed in different vertical planes; pitmen operatively connecting the opposite ends of the double crank arms to the door supporting shafts; sprocket wheels upon the crank arms and main shaft respectively; and chains operatively connecting the sprocket wheels.

7. In a dump car, the combination with a pair of hinged doors having contiguous free sides when closed, of operating means therefor, including a pair of lever arms fulcrumed adjacent the free sides of the doors when closed, operating mechanism applied to such lever arms, and means whereby such arms operate the doors, including laterally movable members connected to such arms and adapted to move across the undersides of the doors.

8. In a dump car, the combination with a pair of hinged doors having contiguous free sides when closed, of a pair of door operating and supporting shafts upon which the doors rest freely, and a pair of lever arms fulcrumed adjacent the free sides of the doors when closed, a unitary operating mechanism for the said lever arms, and means whereby such arms operate the said shafts.

9. In a dump car, the combination with a pair of hinged doors, of operating means including a pair of door operating and supporting shafts upon which the doors rest freely, a pair of lever arms, operating mechanism for such arms, and tension links connecting such arms with the said shafts.

In testimony whereof, I have signed my name to this specification, in the presence of two subscribing witnesses.

ROBERT MONTAGUE ZIMMERMAN.

Witnesses:
STANLEY C. KING,
FRED J. SEARS.